(12) United States Patent
Nakanishi

(10) Patent No.: US 7,808,599 B2
(45) Date of Patent: Oct. 5, 2010

(54) FLAT DISPLAY MODULE

(75) Inventor: Futoshi Nakanishi, Kanagawa (JP)

(73) Assignee: NEC Corporation, Tokyo (JP)

( * ) Notice: Subject to any disclaimer, the term of this patent is extended or adjusted under 35 U.S.C. 154(b) by 146 days.

(21) Appl. No.: 12/169,392

(22) Filed: Jul. 8, 2008

(65) Prior Publication Data

US 2009/0015777 A1 Jan. 15, 2009

(30) Foreign Application Priority Data

Jul. 10, 2007 (JP) .............................. 2007-181384

(51) Int. Cl.
  G02F 1/1333 (2006.01)
  G02F 1/1334 (2006.01)
  G09C 5/00 (2006.01)
  H01R 12/16 (2006.01)
  H01L 23/495 (2006.01)

(52) U.S. Cl. ...................... 349/150; 349/158; 174/254; 257/676; 345/206

(58) Field of Classification Search .................. 349/110, 349/149–151, 187, 150, 158; 345/206; 361/789; 174/254–256; 257/675–676, 693

See application file for complete search history.

(56) References Cited

U.S. PATENT DOCUMENTS

| | | | | |
|---|---|---|---|---|
| 5,838,412 A | * | 11/1998 | Ueda et al. | 349/150 |
| 6,066,512 A | * | 5/2000 | Hashimoto | 438/112 |
| 6,175,151 B1 | * | 1/2001 | Hashimoto | 257/676 |
| 6,515,721 B2 | * | 2/2003 | Jin et al. | 349/58 |
| 7,126,655 B2 | * | 10/2006 | Muramatsu | 349/110 |
| 7,161,650 B2 | * | 1/2007 | Hirano | 349/150 |
| 7,359,215 B2 | * | 4/2008 | Ochiai et al. | 361/789 |
| 2008/0137020 A1 | * | 6/2008 | Takahashi et al. | 349/150 |

FOREIGN PATENT DOCUMENTS

| | | | |
|---|---|---|---|
| JP | 60-94631 A | | 5/1985 |
| JP | 2004-62048 A | | 2/2004 |
| JP | 2005-338699 A | | 12/2005 |
| JP | 3799870 B2 | | 5/2006 |

\* cited by examiner

*Primary Examiner*—Akm E Ullah
(74) *Attorney, Agent, or Firm*—Sughrue Mion, PLLC

(57) ABSTRACT

In a display module, a flexible wiring substrate is connected to a terminal portion of a flat display panel, and a reinforcing member is attached to at least one surface of the display panel. The reinforcing member is made wider than the flexible substrate and is arranged so as to cover those regions extending from an overlapping region of two substrates of the display panel to a region extending and reaching the flexible substrate located outside of the terminal portion.

8 Claims, 4 Drawing Sheets

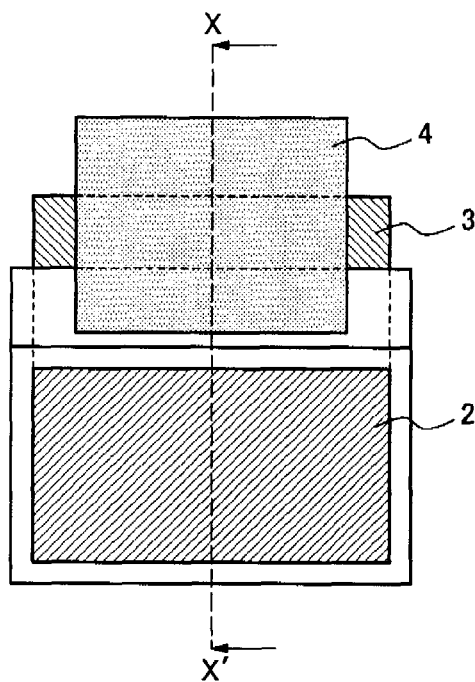
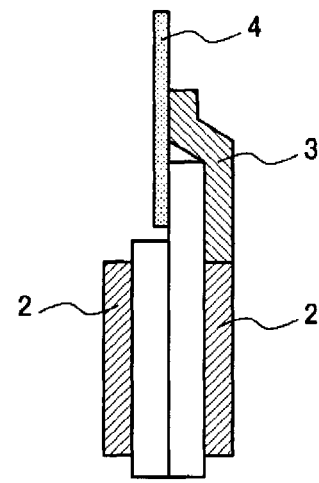
Fig. 1A            Fig. 1B
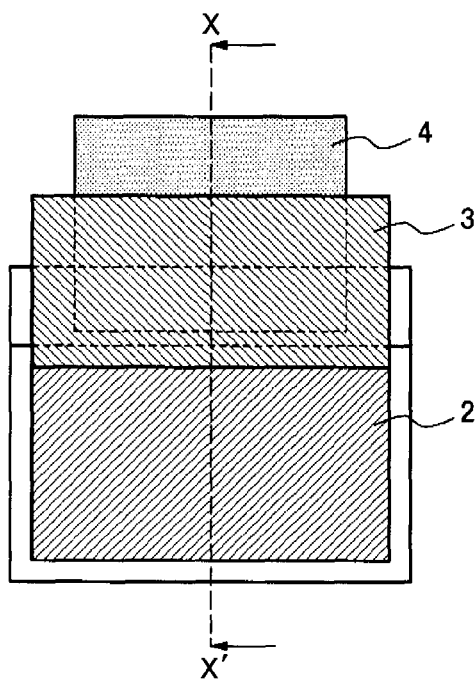
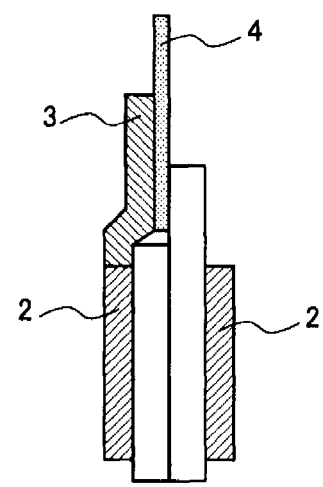
Fig. 2A            Fig. 2B

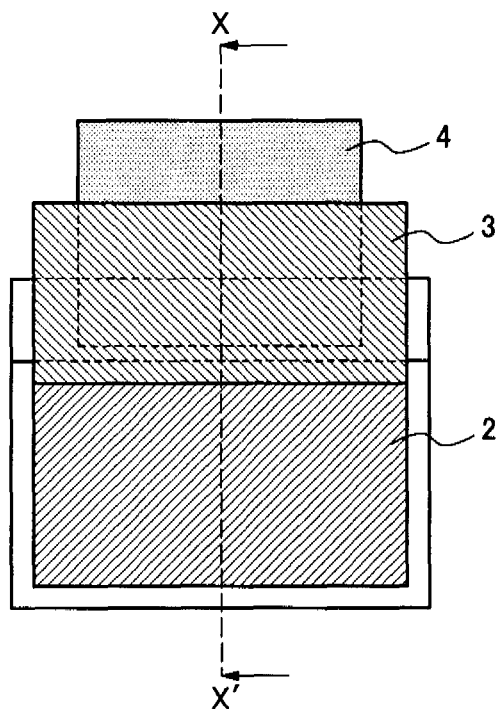
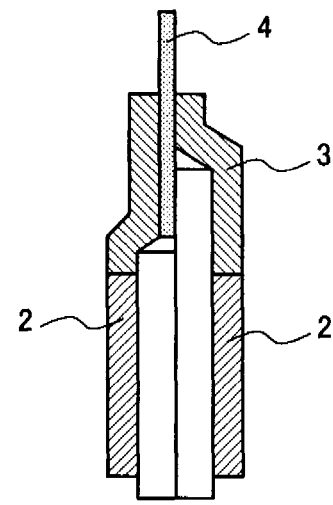
Fig. 3A  Fig. 3B
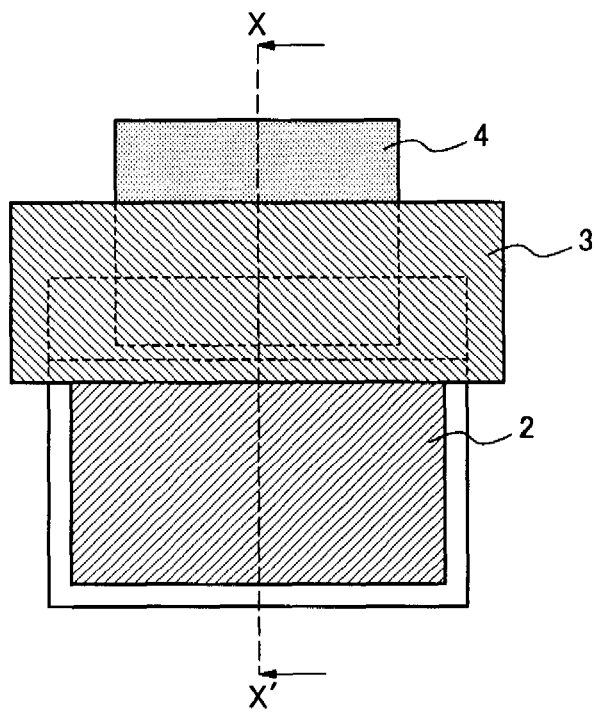
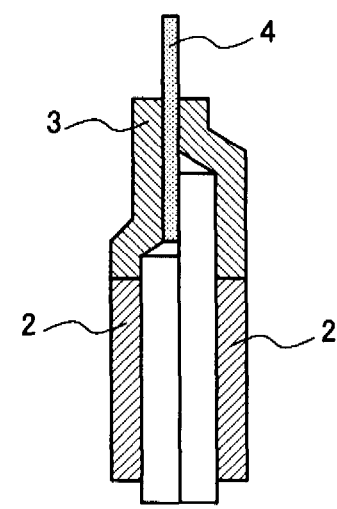
Fig. 4A  Fig. 4B

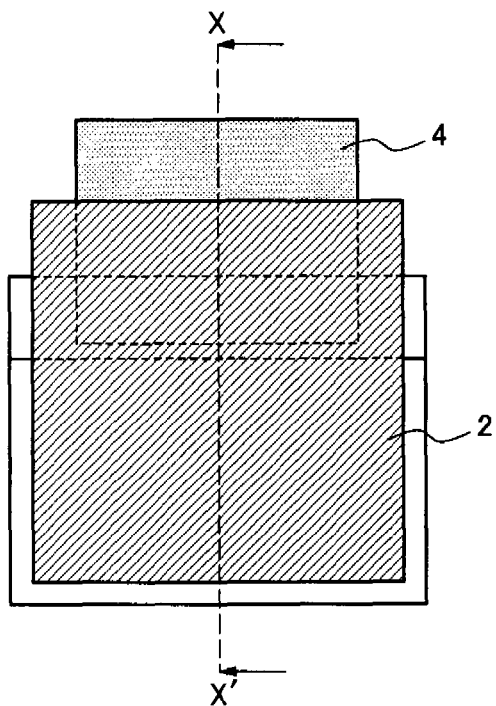
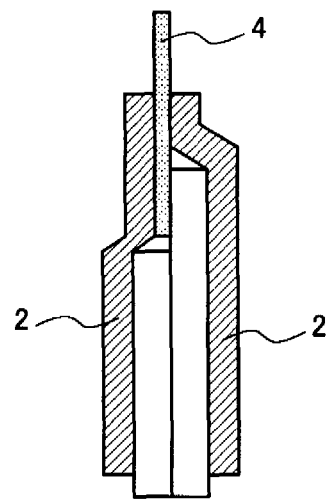
Fig. 5A  Fig. 5B
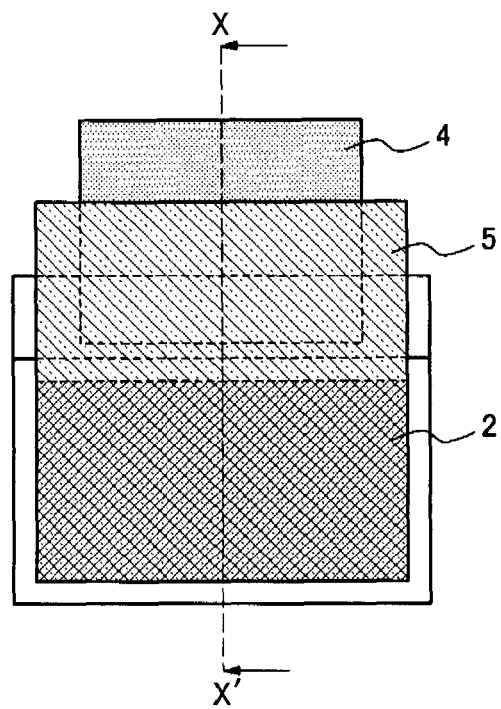
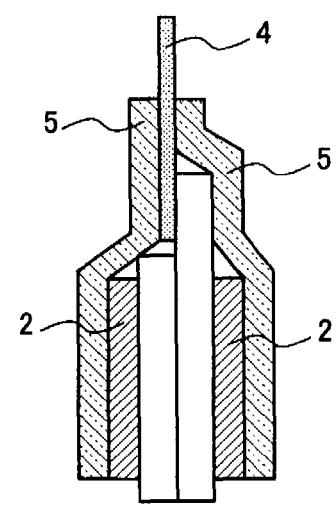
Fig. 6A  Fig. 6B

FLAT DISPLAY MODULE

INCORPORATION BY REFERENCE

This application is based upon and claims the benefit of priority from Japanese Patent Application No. 2007-181384, filed on Jul. 10, 2007, the disclosure of which is incorporated herein in its entirety by reference.

BACKGROUND OF THE INVENTION

1. Technical Field

The present invention relates to a flat display module and in particular, relates to the reinforcing structure for a flat display panel with a flexible wiring substrate such as TCP (Tape Carrier Package) and COF (Chip on Film) connected to the display panel.

2. Background Art

A flat display device such as a liquid crystal display device (hereinafter, referred to as an LCD device) is widely used in such fields as the office automation equipment, the audio visual equipment and the portable terminal equipment due to its beneficial feature such as thin type, light-weight and low power consumption. This LCD device includes a liquid crystal display module (hereinafter, referred to as an LCD module) and a backlight module. As is shown in FIG. 7A and FIG. 7B, the LCD module includes a liquid crystal (LC) panel 1, a pair of polarizing plates 2, and a flexible wiring substrate 4 (hereinafter, referred to as a flexible substrate.) The LC panel is composed of two transparent substrates sandwiching liquid crystal therebetween. The polarizing plates 2 are disposed on front and rear surfaces of the LC panel 1. The flexible substrate 4 is provided with a driver IC for driving the LC panel 1.

To make the LCD device thin is a significant issue and thus further thinning of the transparent substrates of the LC panel is desired. In recent years, accordingly, such thin transparent substrates as of no more than 0.5 mm thickness have been used, and more thinner transparent substrates of 0.4 mm or 0.3 mm thickness have been also tried.

By using such thin transparent substrates, a thin LC panel can be realized. However, breakage or crack at a peripheral portion of the transparent substrates tends to occur, in particular, at region adjacent to connecting portion for the flexible substrate due to mechanical pressure caused thereat. The flexible substrate itself tends to brake away from the panel due to its own cut or a crack of electrodes at terminal portion. Moreover, when the thickness of the transparent substrate becomes about 0.2 mm or less, the above-mentioned defects tend to occur in a high probability even under such stress caused by a step of general handling by workers. To deal with such problem, the connecting portion of transparent substrate and a flexible substrate would be coated with resin to reinforce that portion. However, there would be a problem that the manufacturability becomes low and thus requiring higher cost.

In order to try to avoid the above-mentioned problems, various methods are proposed. For example, a large-sized polarizing plate is coated on outer surface of an LC panel so as to extend outside of edges of the transparent substrate to protect the edge portions of the substrate, as disclosed in Japanese Utility-model application Laid-Open No. 60-94631 and Japanese Patent Publication No. 3799870.

On the other hand, in Japanese Patent Application Laid-Open No. 2005-338699, a pair of reinforcing tapes is used to sandwich a connecting portion of a flexible substrate and an LC panel. In Japanese Patent Application Laid-Open No. 2004-62048, a reinforcing tape is also used to cover the edge portion of an LC panel and bonded to a flexible substrate.

However, in the structure using a large-sized polarizing plate as disclosed in the above stated former two prior documents (No. 3799870 and No. 60-94631), there is no protective function for the flexible substrate, and thus cut and breakup of a flexible substrate cannot be prevented.

In the structure using a reinforcing tape as disclosed in the above stated latter two prior documents (No. 2005-338699 and No. 2004-62048), the width of the cited reinforcing tape is narrower than the flexible substrate, and thus cut and breakup of the flexible substrate cannot be prevented. This is because the reinforcing tape does not cover the whole part where transparent substrate is one, and thus breakage and lacking of transparent substrate cannot be prevented.

SUMMARY

An exemplary object of the invention is to provide a flat display module which prevents breakage and lacking of a substrate at adjacent area of a connecting portion with a flexible wiring substrate and preventing a cut and breakup of the flexible wiring substrate itself.

A flat display module according to an exemplary aspect of the invention, a flexible wiring substrate is connected to a terminal portion of a flat display panel, and a reinforcing member is attached to at least one surface of the display panel. The reinforcing member is made wider than the flexible substrate and is arranged so as to cover those regions extending from an overlapping region of two substrates of the display panel to a region extending and reaching the flexible substrate located outside of the terminal portion.

BRIEF DESCRIPTION OF THE DRAWINGS

Exemplary features and advantages of the present invention will become apparent from the following detailed description when taken with the accompanying drawings in which:

FIG. 1A is a plan view showing a structure of an LCD module according to the first exemplary embodiment of the present invention;

FIG. 1B is a cross sectional view along X-X' line of FIG. 1A;

FIG. 2A is a plan view showing a structure of an LCD module according to the second exemplary embodiment of the present invention;

FIG. 2B is a cross sectional view along X-X' line of FIG. 2A;

FIG. 3A is a plan view showing a structure of the LCD module according to the third exemplary embodiment of the present invention;

FIG. 3B is a cross sectional view along X-X' line of FIG. 3A;

FIG. 4A is a plan view showing a structure of the LCD module according to the fourth exemplary embodiment of the present invention;

FIG. 4B is a cross sectional view along X-X' line of FIG. 4A;

FIG. 5A is a plan view showing a structure of the LCD module according to the fifth exemplary embodiment of the present invention;

FIG. 5B is a cross sectional view along X-X' line of FIG. 5A;

FIG. 6A is a plan view showing a structure of the LCD module according to the sixth exemplary embodiment of the present invention;

FIG. 6B is a cross sectional view along X-X' line of FIG. 6A;

EXEMPLARY EMBODIMENT

Exemplary Embodiment 1

Figures 7A, 7B:
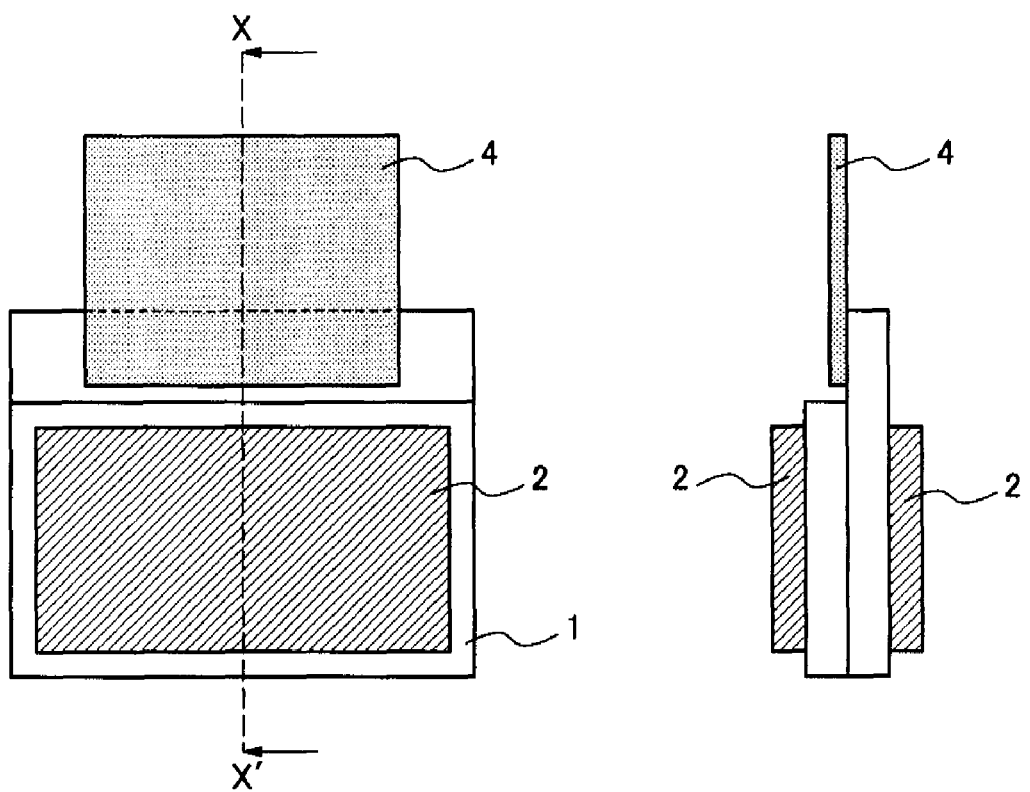
FIG. 7A is a plan view showing a structure of the conventional LCD module.
FIG. 7B is a cross sectional view along X-X' line of FIG. 7A.

Exemplary embodiments of the present invention will now be described in detail in accordance with the accompanying drawings.

In order to describe the embodiment of the above-mentioned present invention more in detail, an LCD module according to a first exemplary embodiment of the present invention will be described with reference to FIG. 1A and FIG. 1B.

Generally, an LCD device includes an LCD module and a backlight which illuminates the LCD module. The LCD module includes an LC panel, a pair of polarizing plates and a flexible wiring substrate or simply called a flexible substrate.

As shown in FIG. 1A and FIG. 1B, an LC panel 1 includes two transparent substrates such as glass substrate with liquid crystal interposed therebetween. One of the substrates is provided with switching elements such as thin film transistors (TFTs) and thus called as a TFT substrate hereinafter. The other substrate is provided with a black matrix and color filters (CFs), and thus it is called a CF substrate hereinafter. The TFT substrate is designed to be larger than a CF substrate such that a terminal portion is formed on a protruded side of the TFT substrate for electrically connecting the flexible substrate which is provided with a driving IC for driving the LC panel 1. A pair of polarizing plates 2 is designed to be smaller than both of the TFT and CF substrates so as not to be protruded from each side thereof when the polarizing plates 2 are fixed on front and rear surfaces of the LC panel 1.

On an outside surface of the TFT substrate, i.e., an opposite surface of the CF substrate, a reinforcing member 3 is attached such that the reinforcing member 3 successively extends from an overlapped area of the TFT and CF substrates to the flexible substrate 4 outside the terminal portion of the TFT substrate as shown in FIG. 1B. In a plan view as shown in FIG. 1A, the reinforcing member 3 is extended so as to be wider than a width of the flexible substrate 4.

This reinforcing member 3 is made of plastic material such as PET (polyethylene terephthalate), but not limited to such material. The thickness of the reinforcing member 4 is not also limited in particular, and it can be set appropriately according to the characteristic of the used material.

This first exemplary embodiment is suitable for reinforcing the transparent substrate because the reinforcing member 3 is directly attached firmly to the weakest part of the transparent substrate, i.e., a protruding portion thereof.

Hereinafter, a method of manufacturing an LCD module of the above-mentioned structure will be described.

First, one of transparent substrates (a TFT substrate in this exemplary embodiment) is prepared to be larger than the other transparent substrate (a CF substrate in this exemplary embodiment) such that a terminal portion is formed at protruded area of one side of the TFT substrate, and the LC panel is manufactured by using a well known method. The thinner the thickness of the transparent substrates is, the larger the benefit of the present invention is, specially, when the thickness of no more than 0.2 mm of the transparent substrates, its remarkable advantage is confirmed.

Various types of LC panels and driving systems are available for the LC panel 1 of the present invention, such as TN-type (Twisted Nematic type), IPS-type (In Plane Switching type), and VA-type (Vertical Alignment type), but not limited to the above-mentioned drive systems.

Next, a polarizing plate 2 is attached on a front surface and a rear surface of an LC panel, respectively. In this exemplary embodiment, the size of each polarizing plate 2 is smaller than that of each transparent substrate of the LC panel 1, but its thickness, material, and optical characteristic are not limited to particular ones.

Next, the flexible substrate 4 is bonded to the terminal portion of the TFT substrate of the LC panel 1 after adjusting its position and by using, for example, an anisotropic conductive film (ACF) or thermosetting resin (not shown).

Next, a positioning alignment is made between the reinforcing member 3 and the LC panel 1 connected with the flexible substrate 4. Specifically, in a sectional view, the reinforcing member 3 is positioned on at least one surface of the LC panel so as to cover those regions extending from an overlapping region of the opposed transparent substrates to the flexible substrate 4 located outside of the terminal portion. In a plan view, it is adjusted so that the reinforcing member 3 is arranged so as to be protruded outward from both sides of the flexible substrate 4. At that time, it is desirable to adjust so that an edge of the reinforcing member 3 is in contact with a side of the polarizing plate 2. Further, in FIG. 1A and FIG. 1B, although the reinforcing member 3 is adhered to the side of the polarizing plate 2, the reinforcing member 3 may run aground on the surface of the polarizing plate 2, or it may be slightly separated from the side of the polarizing plate 2.

After the above-mentioned positioning adjustment, the LCD module will be completed by attaching the reinforcing member 3 on both of the LC panel 1 and the flexible substrate 4. The attaching method of this reinforcing member 3 is arbitrarily selected. For example, it would be attached and fixed by using every kind of materials and methods such as thermosetting resin, room temperature hardening resin, photo-setting resin and an adhesion sheet. When a gap occurs between the reinforcing member 3 and either of the LC panel 1 or the flexible substrate 4, resin or the like would be filled into the gap to make a reinforcement effect more firmly.

After that, the LCD module is combined with a backlight module by using a chassis to complete the LCD device.

As described above, the strength of the transparent substrate is improved by attaching the reinforcing member 3 which is wider than the flexible substrate 4 on an area extending from an overlapping region of the opposed transparent substrates to the flexible substrate 4 located outside of the terminal portion. As a result, breakage and lacking of transparent substrate can be prevented and a contact portion of a flexible substrate 4 and the transparent substrate is also reinforced, and cut and breakaway of a flexible substrate 4 can also be prevented.

Exemplary Embodiment 2

Next, an LCD module according to the second exemplary embodiment of the present invention will be described with reference to FIG. 2A and FIG. 2B. FIG. 2B is a cross sectional view along an X-X' line of FIG. 2A which is a plan view of the LCD module of this exemplary embodiment.

In this exemplary embodiment, a reinforcing member 3 is provided on a CF substrate contrary to the first above-mentioned exemplary embodiment where the reinforcing member 3 is attached on the TFT substrate to which the flexible substrate 4 is connected.

Even the second exemplary embodiment has approximately similar effect like in the first exemplary embodiment. While the first exemplary embodiment is suitable for reinforcing the transparent substrate due to the structure that the reinforcing member 3 is directly attached firmly to the weakest part of the transparent substrate, i.e., a protruding portion thereof, the second exemplary embodiment is suitable for reinforcing the flexible substrate 4. This is because an area where a flexible substrate 4 and reinforcing member 3 are directly attached firmly. Therefore, as to the reinforcement of a flexible substrate 4, the second exemplary embodiment is suitable than the case of the first exemplary embodiment.

Exemplary Embodiment 3

Next, an LCD module according to the third exemplary embodiment of the present invention will be described with reference to FIG. 3A and FIG. 3B, which are a plan view showing the structure of the LCD module of this exemplary embodiment and cross sectional views along an X-X' line of FIG. 3A.

In this exemplary embodiment, each reinforcing member 3 is attached both sides of an LC panel 1 to increase the reinforcing effect compared with the first and second exemplary embodiments mentioned above wherein only one reinforcing member is attached either one of transparent substrates.

Exemplary Embodiment 4

Next, an LCD module according to the fourth exemplary embodiment of the present invention will be described with reference to FIG. 4A and FIG. 4B, which are a plan view showing the structure of the LCD module of this exemplary embodiment and cross sectional views along an X-X' line of FIG. 4A.

In this fourth exemplary embodiment, each reinforcing member 3 is attached to both sides of an LC panel and each width of the reinforcing members 3 is made larger than the transparent substrates of the LC panel 1, in contrast to the foregoing exemplary embodiments where the width of the reinforcing member is made larger than a flexible substrate 4 but smaller than the transparent substrates. According to this fourth exemplary embodiment, the side edges of the transparent substrates are protected by the reinforcing members 3. This exemplary embodiment is effective to such a case that a TFT substrate is provided with a circuit function even at side edge portion thereof.

Exemplary Embodiment 5

Next, an LCD module according to the fifth exemplary embodiment of the present invention will be described with reference to FIG. 5A and FIG. 5B, which are a plan view showing the structure of the LCD module of this exemplary embodiment and cross sectional views along an X-X' line of FIG. 5A.

In this fifth exemplary embodiment, a pair of polarizing plates 2 is designed to act as a pair of reinforcing members by using extended polarizing plates 2, in contrast to the foregoing first to fourth exemplary embodiments wherein the reinforcing member 3 is newly attached to the LC panel.

As for a manufacturing method for this exemplary embodiment, it is possible to attach the polarizing plates 2 on an LC panel 1 after connecting a flexible substrate 4 to the LC panel 1. In this exemplary embodiment, new reinforcing member 3 is unnecessary and thus reduction of members-cost and manufacturing process are attained.

Although both polarizing plates 2 are extended in this exemplary embodiment, only one of polarizing plates 2 can be used by extending it to the flexible substrate 4.

Exemplary Embodiment 6

Next, an LCD module according to the sixth exemplary embodiment of the present invention will be described with reference to FIG. 6A and FIG. 6B, which are a plan view showing the structure of the LCD module of this exemplary embodiment and cross sectional views along an X-X' line of FIG. 6A.

In the previous fifth exemplary embodiment mentioned above, the polarizing plates 2 are used as the reinforcing member. However, in this sixth exemplary embodiment, at least one optical sheet is used to make a reinforcing function like the reinforcing member 3 shown in the previous exemplary embodiments. Such configuration can be applied to an LC panel provided with at least one optical sheet such as an anti-reflection sheet or lens-sheet. In this sixth exemplary embodiment, each optical sheet 5 is provided on each polarizing plate 2.

In the foregoing, although an optical sheet is mentioned, this exemplary embodiment is not limited to the optical sheet having some optical functions, but a ordinary sheet without having such optical functions would be used when it has a transparent area so as not to disturb the display area of the LCD device. Such non-optical sheet would be used instead of using the optical sheet or would be used other than the optical sheet to provide similar effect of the present invention.

Although not illustrated, the optical sheet 5 functioning as a reinforcing member would be made larger than the LC panel 1 to improve the reinforcing effect more firmly as the whole. Furthermore, by making the optical sheet 5 with such material as being softer than the transparent substrate and with low Young's modulus to make it easy to bend, inhibiting effect to a crack is improved.

Each above-mentioned exemplary embodiment describes the structure by which a flexible substrate 4 is connected to one side in a substrate end of an LC panel 1. Needless to say, however, the similar advantage would be obtained even in a case that such a component as a driver IC for driving LC panel 1 is mounted directly on the transparent substrate of an LC panel 1.

In each above-mentioned exemplary embodiment, although a case when the structure of the present invention is applied to an LCD device is indicated, the present invention is not limited to the above-mentioned exemplary embodiments, and it can be applied similarly to an optional display apparatus where a flexible substrate is connected to a substrate which tends to break like a glass substrate.

The present invention is available in an LCD device and also in a flat display panel in general such as a plasma display panel and electroluminescence display panel.

An exemplary advantage according to the invention is that such breakage and lacking of transparent substrate adjacent to the flexible substrate, and cut and breakaway of a flexible substrate can be prevented.

The reasons of the above stated advantages are as follows. Since the reinforcing member is attached to an area which extends from an overlapping portion of opposing thin substrates to a flexible substrate outside the terminal portion, that is, an area where its mechanical strength is weakest due to single substrate portion, it is possible to improve the strength of the thin transparent substrate and the flexible substrate.

In such structure where the width of a reinforcing member is made wider than a flexible substrate to protrude outside thereof, it is possible to reinforce both side parts of the flexible substrate which mostly tends to breakaway.

Even in such structure where a polarizing plate or an optical sheet is made to function as a reinforcing member, it is possible to improve the strength of the transparent substrate and the flexible substrate.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A flat display module, comprising:
    a flat display panel including two substrates opposing each other, one of said substrates being provided with a terminal portion extended from an overlapping region of said substrates along a first direction;
    a flexible wiring substrate connected to said terminal portion, said flexible wiring substrate being provided with a driver circuit for driving said display panel and said flexible wiring substrate extending along said first direction; and
    a reinforcing member attached to at least one surface of said display panel so as to cover those regions extending along said first direction from an overlapping region of said substrates to a region wherein said flexible substrate does not overlap with said terminal portion so that said flexible substrate and said reinforcing member are directly and firmly attached, said reinforcing member being wider than a width of said flexible substrate in a second direction perpendicular to, and on a same plane as, said first direction.

2. The flat display module according to claim 1, wherein said display panel is a liquid crystal panel including a liquid crystal sandwiched between a first transparent substrate and a second transparent substrate, said first transparent substrate being provided with said terminal portion on at least one side thereof;
    wherein a size of said first transparent substrate larger than a size of said second transparent substrate and wherein said first transparent substrate is arranged such that said terminal portion is formed on a protruded side of said first transparent substrate for electrically connecting said flexible substrate; and
        further comprising a first polarizing plate and a second polarizing plate arranged on a front surface and a rear surface of said liquid crystal panel, respectively, wherein a size of each of said first and second polarizing plates is smaller than a size of said second transparent substrate so as not to be protruded from each side of said second transparent substrate.

3. The flat display module according to claim 2, wherein an edge of said reinforcing member is in contact with an edge of said polarizing plate or in overlaps with said polarizing plate.

4. The flat display module according to claim 1, wherein a width of said reinforcing member is larger than said display panel.

5. The flat display module according to claim 2, wherein each thickness of said transparent substrates is no more than 0.2 mm.

6. The flat display module according to claim 1, wherein said display panel is a liquid crystal panel including a liquid crystal sandwiched between a first transparent substrate and a second transparent substrate, said first transparent substrate being provided with said terminal portion on at least one side thereof, and said second transparent substrate is smaller than said first transparent substrate and arranged to expose said terminal portion; and
    further comprising a first polarizing plate and a second polarizing plate arranged on a front surface and a rear surface of said liquid crystal panel, respectively, so as to cover an overlapping area of said first transparent substrate and said second transparent substrate, a width of at least one of said first and second polarizing plates is larger than a width of said flexible substrate.

7. The flat display module according to claim 1, wherein said display panel is a liquid crystal panel including a liquid crystal sandwiched between a first transparent substrate and a second transparent substrate, said first transparent substrate being provided with said terminal portion on at least one side thereof, and said second transparent substrate being smaller than said first transparent substrate and arranged to expose said terminal portion; and
    further comprising a first polarizing plate and a second polarizing plate arranged on a front surface and a rear surface of said liquid crystal panel, wherein a size of each of said polarizing plates is smaller than a size of said second transparent substrate; and wherein said reinforcing member is at least one of optical sheets located outside of at least one of said polarizing plates so as to cover an overlapping area of said first transparent substrate and said second transparent substrate, a width of at least one of said optical sheets is larger than a width of said flexible substrate and said at least one of said optical sheets extends from an overlapping region of said first transparent substrate and said second transparent substrate to a region wherein said flexible substrate does not overlap with said terminal portion.

8. The flat display module according to claim 7, wherein Young's modulus of said optical sheet is lower than that of said transparent substrates.

* * * * *